United States Patent
Saito

(10) Patent No.: US 11,518,852 B2
(45) Date of Patent: Dec. 6, 2022

(54) POLYAMIDEIMIDE RESIN AND USE THEREOF

(71) Applicant: SHOWA DENKO MATERIALS CO., LTD., Tokyo (JP)

(72) Inventor: Yasuyuki Saito, Hitachi (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/489,401

(22) PCT Filed: Mar. 1, 2017

(86) PCT No.: PCT/JP2017/008090
§ 371 (c)(1),
(2) Date: Aug. 28, 2019

(87) PCT Pub. No.: WO2018/158877
PCT Pub. Date: Sep. 7, 2018

(65) Prior Publication Data
US 2019/0382530 A1   Dec. 19, 2019

(51) Int. Cl.
| | | |
|---|---|---|
| *C08G 73/10* | (2006.01) | |
| *C08G 18/80* | (2006.01) | |
| *C08L 79/08* | (2006.01) | |
| *C08G 73/14* | (2006.01) | |

(52) U.S. Cl.
CPC ............ *C08G 73/10* (2013.01); *C08G 18/80* (2013.01); *C08G 73/14* (2013.01); *C08L 79/08* (2013.01)

(58) Field of Classification Search
CPC ......... C08L 79/08; C08G 73/14; C08G 73/10; C09D 179/08
See application file for complete search history.

(56) References Cited

U.S. PATENT DOCUMENTS

| | | | | |
|---|---|---|---|---|
| 3,578,639 | A * | 5/1971 | Sheffer | C08G 73/14 427/418 |
| 5,387,652 | A * | 2/1995 | Kawaki | C08L 79/08 525/419 |
| 2008/0146764 | A1 * | 6/2008 | Gertzmann | C08G 18/807 528/45 |
| 2010/0018756 | A1 * | 1/2010 | Shimeno | B32B 15/18 428/458 |
| 2015/0299513 | A1 * | 10/2015 | Kelly | C08G 73/1035 524/96 |
| 2016/0002408 | A1 * | 1/2016 | Sidenstick | C09D 7/20 528/53 |

FOREIGN PATENT DOCUMENTS

| | | |
|---|---|---|
| JP | 2-24908 | 1/1990 |
| JP | 4-39323 | 2/1992 |
| JP | 8-143663 | 6/1996 |
| JP | 10-265670 | 10/1998 |
| JP | 2005-539123 | 12/2005 |
| JP | 2007-100079 | 4/2007 |
| JP | 2007-146101 | 6/2007 |
| JP | 2009-1723 | 1/2009 |
| JP | 2012-520917 | 9/2012 |
| JP | 2014-240450 | 12/2014 |
| KR | 20100109203 | * 10/2010 |

OTHER PUBLICATIONS

International Search Report dated Apr. 18, 2017 in International (PCT) Application No. PCT/JP2017/008090.

* cited by examiner

*Primary Examiner* — Gregory Listvoyb
(74) *Attorney, Agent, or Firm* — Wenderoth, Lind & Ponack, L.L.P.

(57) ABSTRACT

A polyamideimide resin having an isocyanate group blocked with a compound selected from the group consisting of alcohols, oximes and lactams, and having a carboxyl group blocked with a vinyl ether group-containing compound.

6 Claims, No Drawings

POLYAMIDEIMIDE RESIN AND USE THEREOF

TECHNICAL FIELD

Embodiments of the present invention relate to a polyamideimide resin and a method for producing the same, a composition that contains the resin, and a cured film obtainable from the composition and a method for producing the same.

BACKGROUND ART

Polyamideimide resins generally have aromatic rings and exhibit excellent heat resistance, chemical resistance and solvent resistance, and are therefore widely used as coating agents for various substrates. For example, polyamideimide resins are used as varnishes for enameled wires and as heat-resistant coating materials and the like.

It is known that polyamideimide resins are obtained by reacting a diisocyanate compound and an acid component such as a tribasic acid anhydride, and stabilizing the resins by blocking the terminal isocyanate groups with a blocking agent such as an alcohol, phenol or oxime (Patent Document 1). Furthermore, polyamideimide resins in which lactam structures have been added to the terminals using a blocking agent such as ε-caprolactam are also known (Patent Document 2).

PRIOR ART DOCUMENTS

Patent Documents

Patent Document 1: JP 2007-146101 A
Patent Document 2: JP 2014-240450 A

SUMMARY OF INVENTION

Problems Invention Aims to Solve

When carboxyl groups derived from the tribasic acid also exist in a polyamideimide resin, the formyl group of the N,N-dimethylformamide or the like used in the synthesis of the polyamideimide resin may react with the carboxyl groups, and as a result problems may arise, including a deterioration in the low-temperature curability when curing is performed using a curing agent, or a deterioration in the flexibility of the cured film.

Accordingly, an embodiment of the present invention has an object of providing a polyamideimide resin which can be cured by low-temperature curing that includes a curing step at 150 to 180° C., and enables the formation of a cured film having excellent flexibility by low-temperature curing.

Means for Solution of the Problems

One aspect of the present invention provides a polyamideimide resin having an isocyanate group blocked with a compound selected from the group consisting of alcohols, oximes and lactams, and having a carboxyl group blocked with a vinyl ether group-containing compound.

Another aspect of the present invention provides a method for producing a polyamideimide resin that comprises:

reacting a polyvalent isocyanate and a tribasic acid anhydride and/or tribasic acid halide in an N-formyl group-containing solvent to obtain a polyamideimide resin having an isocyanate group and a carboxyl group, and blocking the isocyanate group of the polyamideimide resin with a compound selected from the group consisting of alcohols, oximes and lactams, and blocking the carboxyl group with a vinyl ether group-containing compound.

Another aspect provides a method for producing a polyamideimide resin that comprises reacting a polyvalent isocyanate having an isocyanate group that has been blocked with a compound selected from the group consisting of alcohols, oximes and lactams, with a tribasic acid anhydride and/or tribasic acid halide having a carboxyl group that has been blocked with a vinyl ether group-containing compound, in an N-formyl group-containing solvent.

Another aspect provides a polyamideimide resin composition comprising the polyamideimide resin described above and (B) an N-formyl group-containing solvent.

Another aspect provides a cured film obtainable by using the polyamideimide resin described above.

Yet another aspect provides a method for producing a polyamideimide resin cured film that comprises:

heating a polyamideimide resin composition containing (A) the polyamideimide resin, (B) an N-formyl group-containing solvent, and (C) a curing agent at 150 to 180° C. for at least 10 minutes.

Effects of the Invention

The polyamideimide resin according to one aspect of the present invention has the isocyanate group and carboxyl group blocked with specific compounds, and can therefore be cured at a low temperature, meaning a cured film having excellent flexibility can be provided.

EMBODIMENTS FOR CARRYING OUT THE INVENTION

Preferred embodiments are described below, but the present invention is not limited to these embodiments.

1. Polyamideimide Resin

The polyamideimide resin is characterized by being a blocked polyamideimide resin having an isocyanate group blocked with a compound selected from the group consisting of alcohols, oximes and lactams, and having a carboxyl group blocked with a vinyl ether group-containing compound. As described below, this polyamideimide resin may contain a portion of unblocked isocyanate groups and/or unblocked carboxyl groups, but is a resin in which at least a portion of the isocyanate groups and carboxyl groups are blocked with the specified compounds. In other words, this polyamideimide resin is a polyamideimide resin having isocyanate group(s) and carboxyl group(s), wherein at least a portion of the isocyanate groups are blocked with a compound selected from the group consisting of alcohols, oximes and lactams, and at least a portion of the carboxyl groups are blocked with a vinyl ether group-containing compound.

By blocking the isocyanate group(s) and carboxyl group(s) with these specific compounds, the reactivity of the polyamideimide resin can be controlled. Further, it is thought that because this blocking of the isocyanate group(s) and carboxyl group(s) with specific compounds can be easily removed by heating, curing of the polyamideimide resin is not impeded, and curing can proceed even at low temperature.

In relation to the carboxyl groups, nucleophilic reactions such as acylation reactions generally occur, particularly in those cases where a solvent having a functional group that reacts with a carboxyl group is included as a synthesis solvent or the like for the polyamideimide resin. In other words, if a compound containing a formyl group (such as N-formylmorpholine or N,N-dimethylformamide) is used as a solvent, then upon heating, there is a possibility that the formyl group may react with the carboxyl group (acylation) from temperatures near 130° C., causing a deterioration in the reactivity between the resin and the curing agent such as an epoxy resin or isocyanate compound.

In contrast, by blocking (protecting) the carboxyl group(s) using a vinyl ether group, acylation of the carboxyl groups by formyl groups can be favorably inhibited. Blocking using a vinyl ether group cannot be removed at normal temperatures, meaning the storage stability of the resin composition can be improved, but the blocking can be easily removed by heating, enabling the curability of the resin to be improved.

Further, blocking the isocyanate group(s) is also preferred in terms of suppressing reactions between isocyanate groups and the like, enabling suppression of any deterioration in the curability of the resin or deterioration in the bending resistance of the cured film.

The existence of protective (blocking) groups in the polyamideimide resin can be confirmed by NMR measurements such as $^1$H-NMR and $^{13}$C-NMR.

The polyamideimide resin of one embodiment is a resin obtained by reacting a polyvalent isocyanate such as a diisocyanate, and a tribasic acid anhydride or a tribasic acid halide as the acid component. An arbitrary combination of a plurality of compounds may be used for each of these raw material compounds. A polyvalent isocyanate is a compound containing two or more isocyanate groups.

For example, a polyamideimide resin containing a structural unit represented by the general formula shown below, and having a free (unreacted) isocyanate group and carboxyl group may be used as the polyamideimide resin prior to blocking. The isocyanate group and carboxyl group include not only groups that exist at the terminals of the main chain or a side chain of the resin, but also include all those residual groups that have not participated in imide group or amide group formation.

[Chemical formula 1]

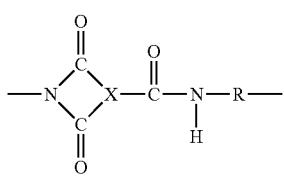

(I)

In general formula (I), X represents a residue that excludes the acid anhydride group (or the acid halide group) and the carboxyl group of the tribasic acid anhydride, and R represents a residue that excludes two isocyanate groups of the polyvalent isocyanate.

Triisocyanates and diisocyanates can be used favorably as the polyvalent isocyanate. Among such compounds, the use of a diisocyanate is preferred, and although there are no particular limitations, the use of compounds such as 4,4'-diphenylmethane diisocyanate, xylylene diisocyanate, 3,3'-diphenylmethane diisocyanate, 3,3'-dimethyl-4,4'-diisocyanatobiphenyl, para-phenylene diisocyanate and toluene diisocyanate is preferred. Among these, from the viewpoint of improving the elastic modulus of the cured film, the use of 3,3'-dimethyl-4,4'-diisocyanatobiphenyl is preferred, whereas in terms of material costs, the use of 4,4'-diphenylmethane diisocyanate is preferred.

Although described in more detail below, in those cases where a monomer in which a portion of the isocyanate groups have already been blocked is used, a compound in which one isocyanate group of a triisocyanate has been blocked or a compound in which one isocyanate group of a diisocyanate has been blocked is preferably used as a portion of the raw material polyvalent isocyanate.

The polyamideimide resin of one embodiment may partly use a diamine in addition to the polyvalent isocyanate. Examples of the diamine compound include 4,4'-diaminodiphenylmethane, 4,4'-diaminodiphenyl ether, 4,4'-diaminodiphenylsulfone, 3,3'-diaminodiphenylsulfone, xylylenediamine and phenylenediamine.

Although there are no particular limitations on the tribasic acid anhydride, trimellitic anhydride is preferred, and although there are also no particular limitations on the tribasic acid halide, tribasic acid chlorides are preferred, and examples include trimellitic anhydride chloride (anhydrotrimellitic acid chloride). From the viewpoint of reducing environmental impact, the use of trimellitic anhydride or the like is preferred.

Although described below in further detail, when a monomer in which a portion of the carboxyl groups have already been blocked is used, a compound in which the free carboxyl group that does not form the acid anhydride in trimellitic anhydride is blocked and/or a compound in which a portion of the carboxyl groups of a tetracarboxylic acid described below are blocked may be used as a portion of the raw material acid component.

Besides the tribasic acid anhydride (or tribasic acid halide) described above, other saturated or unsaturated polybasic acids such as dicarboxylic acids and tetracarboxylic dianhydrides may also be used as the acid component, provided they do not impair the properties of the polyamideimide resin.

There are no particular limitations on the dicarboxylic acids, and examples include terephthalic acid, isophthalic acid, adipic acid and sebacic acid. There are also no particular limitations on the tetracarboxylic dianhydrides, and examples include pyromellitic dianhydride, benzophenone tetracarboxylic dianhydride and biphenyl tetracarboxylic dianhydride. These compounds may be used individually, or an arbitrary combination of a plurality of compounds may be used. From the viewpoint of improving the flexibility of the cured film, the use of adipic acid or sebacic acid is preferred, whereas from the viewpoint of improving the strength, the use of biphenyl tetracarboxylic dianhydride is preferred.

From the viewpoint of maintaining the properties of the polyamideimide resin, the total amount of carboxylic acids (dicarboxylic acids and tetracarboxylic acids) other than the tribasic acid is preferably within a range from 0 to 30 mol % of all the carboxylic acids.

In one preferred embodiment, the polyamideimide resin has a structural unit represented by general formula (II) shown below.

[Chemical formula 2]

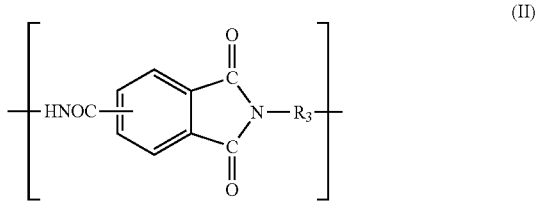

In general formula (II), $R_3$ represents a residue that excludes two isocyanate groups of the polyvalent isocyanate (or an amino group of the optionally used diamine).

From the viewpoint of the molecular weight and the crosslinking degree of the produced polyamideimide resin, the usage ratio between the polyvalent isocyanate such as the diisocyanate and the acid component (the total of the tribasic acid anhydride or tribasic acid halide, and any dicarboxylic acids and tetracarboxylic dianhydrides that may be used as required) is set so that for each 1.0 mol of the total of all the acid components, the amount of the polyvalent isocyanate compound (and any optionally used diamine compound) is preferably within a range from 0.8 to 1.1 mol, more preferably from 0.95 to 1.08 mol, and even more preferably from 1.0 to 1.08 mol.

The polyamideimide resin may be modified by reacting a polyhydric alcohol with the isocyanate. Examples of polyhydric alcohols that may be used include dihydric alcohols such as ethylene glycol, diethylene glycol, triethylene glycol and propylene glycol, and polyhydric alcohols such as glycerol, trimethylolpropane, diglycerol and triglycerol.

The blocking agent (terminal blocking agent) for the isocyanate group comprises a compound selected from the group consisting of alcohols, oximes and lactams. A combination of a plurality of these blocking agents may also be used.

Examples of the alcohols include lower alcohols of 1 to 6 carbon atoms such as methanol, ethanol and propanol. The oximes may be either an aldoxime or a ketoxime. Examples of the lactams include δ-valerolactam and ε-caprolactam. These blocking agents are not limited to the compounds listed above, and a plurality of compound types or a plurality of compounds may also be used.

Among the above compounds, the use of a ketoxime (ketone oxime) is preferred. Examples of ketoximes that can be used favorably include compounds represented by:

$$CRR'=N-OH \qquad \text{(Formula 1)}$$

(wherein each of R and R' independently represents an alkyl group of 1 to 6 carbon atoms). The alkyl groups may be either linear or branched.

Examples of the compounds of formula 1 include dimethyl ketone oxime, methyl ethyl ketone oxime, diethyl ketone oxime, methyl butyl ketone oxime and dibutyl ketone oxime, and from the viewpoints of the elimination temperature and the curing reactivity following elimination, methyl ethyl ketone oxime is the most desirable.

The blocking agent for the carboxyl group contains a vinyl ether group-containing compound.

There are no particular limitations on the vinyl ether group-containing compound, provided the compound contains a vinyl ether group within the molecule, but in a preferred embodiment, alkyl vinyl ethers represented by the following formula may be used.

$$CH_2=CH-O-R \qquad \text{(Formula 2)}$$

(wherein R represents an alkyl group of 1 to 10 carbon atoms). The alkyl group may be either linear or branched.

Examples of the compounds of formula 2 include ethyl vinyl ether, butyl vinyl ether, isopropyl vinyl ether, and 2-ethylhexyl vinyl ether. These alkyl vinyl ethers alter the polarity of the polyamideimide resin in accordance with the number of carbon atoms in the alkyl group, and are therefore preferably selected in accordance with a substrate used for forming a cured film using the resin. For example, if the substrate is aluminum or the like, then a compound in which the number of carbon atoms in the alkyl group is from 3 to 5, such as butyl vinyl ether or isopropyl vinyl ether, is preferably used.

In the following description, the "cured film" is sometimes referred to as a "coating film".

There are no particular limitations on the amount of modification (the blocking rate) by each of the above blocking agents, and substantially all of the isocyanate groups (or terminal isocyanate groups) and carboxyl groups (or terminal carboxyl groups) of the polyamideimide resin may be blocked, or a portion of each group may be left unblocked. For example, by using a preferred amount of blocking agent described below for each functional group, a resin having a preferred amount of modification can be obtained.

If the amount of modification of the isocyanate groups is too small, then there is a possibility of side reactions occurring during curing and heating of the resin, resulting in a deterioration in the curability. If the amount of modification of the carboxyl groups is too small, then there is a possibility of the carboxyl groups undergoing an acylation reaction with the solvent during curing of the resin, resulting in a deterioration in the resin curability. In contrast, by blocking the isocyanate groups and carboxyl groups in the resin using the specified compounds, a cured film having excellent adhesion can be formed, and although particularly marked in the case of low-temperature curing, a cured film of excellent flexibility can also be formed.

It is thought that the vinyl group portion of the vinyl ether group of the vinyl ether group-containing compound (for example, $CH_2=CHOR^1$) undergoes an addition to the carboxyl group (—COOH), forming a blocked acid as an ester (for example, $-COOCH(CH_3)OR^1$). For example, when trimellitic acid which is a solid at normal temperatures is converted to a blocked acid using a vinyl ether group-containing compound, the blocked compound becomes liquid at normal temperatures, which offers additional advantages such as improved workability and improved solubility in solvents.

Although described below in further detail, blocking using these blocking agents may be performed on the monomers prior to synthesis of the polymer, or may be performed during and following synthesis of the polymer.

From the viewpoints of ensuring favorable film formability and coating film strength, the number average molecular weight of the polyamideimide resin is preferably at least 10,000, and more preferably 15,000 or greater. On the other hand, in order to achieve a viscosity that is appropriate when the resin is used as a resin composition and ensure favorable coatability, the number average molecular weight is preferably not more than 50,000, more preferably not more than 30,000, and even more preferably 25,000 or less.

The number average molecular weight of the polyamideimide resin can be controlled within the above range by performing sampling during the resin synthesis, measuring the number average molecular weight with a gel permeation chromatograph (GPC) using a calibration curve prepared using standard polystyrenes, and continuing the synthesis until the targeted number average molecular weight has been achieved. The GPC measurement conditions are described below.

The polyamideimide resin can be used in various applications. For example, the polyamideimide resin can be used as a binder resin for various type of protective and covering materials, including coating materials or coating agents such as heat-resistant coating materials and coating materials for sliding members. Alternatively, the polyamideimide resin can be used favorably as a resin for films which require slipperiness, and in applications for molded items that are molded into belt-like shapes, such as the circular belts that are used as intermediate transfer belts in copying machines. These applications are all non-adhesive applications.

2. Method for Producing Polyamideimide Resin

The polyamideimide resin described above can be produced favorably using one of the three methods described below, depending on the difference in the timing with which blocking is performed.

One method is a method in which the blocking is performed following synthesis of the polymer. In other words, this method is a method for producing a polyamideimide resin that includes:

reacting a polyvalent isocyanate and a tribasic acid anhydride and/or tribasic acid halide in an N-formyl group-containing solvent to obtain a polyamideimide resin having an isocyanate group and a carboxyl group, and blocking the isocyanate group of the polyamideimide resin with a compound selected from the group consisting of alcohols, oximes and lactams, and blocking the carboxyl group with a vinyl ether group-containing compound.

Another method is a method in which the polymer synthesis and the blocking are performed within a single step, namely a one-stage synthesis. In other words, this method is a method for producing a polyamideimide resin that involves reacting a polyvalent isocyanate, a tribasic acid anhydride and/or tribasic acid halide, a compound selected from the group consisting of alcohols, oximes and lactams, and a vinyl ether group-containing compound in an N-formyl group-containing solvent, thereby polymerizing a polyamideimide resin while blocking at least a portion of the isocyanate groups and at least a portion of the carboxyl groups.

Yet another method is a method of performing the polymer synthesis using monomers that have already been blocked. In other words, this method is a method for producing a polyamideimide resin that includes: reacting a polyvalent isocyanate having an isocyanate group that has been blocked with a compound selected from the group consisting of alcohols, oximes and lactams, with a tribasic acid anhydride and/or tribasic acid halide having a carboxyl group that has been blocked with a vinyl ether group-containing compound, in an N-formyl group-containing solvent.

In each of the methods described above, the raw materials that are used are as described above in the section relating to the polyamideimide resin.

In those cases where the raw material compounds are blocked in advance, there are no particular limitations on the reaction solvent, provided it is capable of dissolving the raw material compound, and a polar solvent such a N-methylpyrrolidone or an N-formyl group-containing solvent or the like may be used, with the blocking reaction performed at 60 to 110° C. for 2 to 6 hours. For example, about 0.5 mol of the blocking agent may be used per 1 mol of the raw material, but the ratio is not limited to this.

The polymerization solvent (or the polymerization and blocking solvent) preferably contains an N-formyl group-containing solvent. There are no particular limitations on the N-formyl group-containing solvent, provided it is an organic solvent having an N—CHO group, and examples include N,N-dimethylformamide and 4-morpholine carbaldehyde. A plurality of these solvents may also be used. From the viewpoint of the working environment, 4-morpholine carbaldehyde is preferred.

Other polymerization solvents may be used in portions, and examples include N-methyl-2-pyrrolidone, N,N'-dimethylethyleneurea, N,N-dimethylacetamide or N,N-dimethylformamide and γ-butyrolactone, and appropriate combinations of two or more of these solvents may also be used. When another organic solvent is used, the N-formyl group-containing solvent preferably represents 50 to 100% by mass of the total polymerization solvent composition, and this proportion is, in increasing order of preference, at least 60% by mass, at least 70% by mass, at least 80% by mass, or 90% by mass or greater, and is most preferably 100% by mass.

There are numerous possible polymerization conditions, and therefore the conditions cannot be easily specified, but examples of the most representative methods for reacting a diisocyanate and a tribasic acid anhydride include the method disclosed in JP H04-39323 A.

A catalyst may be used in the polymerization. Examples of the catalyst include tertiary amines and phosphonic acid-based compounds. These catalysts may be selected as appropriate in accordance with the polymerization temperature and the purification method, but in terms of facilitating separation following synthesis, triethylamine is preferred.

There are no particular limitations on the reaction temperature during the polymerization, which may be set appropriately in accordance with the boiling point of the polymerization solvent being used. When N-morpholine carbaldehyde is used as the polymerization solvent, reaction is preferably performed at a temperature of 70 to 100° C. In order to reduce the effect of moisture in the air, the polymerization reaction is preferably conducted under an atmosphere of nitrogen or the like. In a more preferred embodiment, the resin may be synthesized by using a catalyst described above and heating at about 70 to 80° C. At high temperatures exceeding 80° C., reactions between the isocyanate and the formyl group in the polymerization solvent, and reactions between isocyanate groups start to occur, meaning there is a possibility of a deterioration in the subsequent curability, but provided the reaction temperature is from 70° C. to about 80° C., these types of reactions can be inhibited.

Further, the blocking performed after the synthesis of the resin is preferably performed by adding the blocking agent to the polymerized resin solution, and then performing heating at about 70 to 120° C.

There are no particular limitations on the amount of the blocking agent used, but in order to achieve a satisfactory blocking effect, for example, the amount of the oxime (such as a ketoxime) per 1 mol of the polyvalent isocyanate (such as a diisocyanate) is preferably within a range from 0.01 to 0.25 mol, more preferably from 0.03 to 0.22 mol, and even more preferably from 0.05 to 0.2 mol. Further, the amount of the vinyl ether group-containing compound (such as an alkyl vinyl ether) per 1 mol of the tribasic acid anhydride or tribasic acid halide is preferably within a range from 0.01 to 0.2 mol, and more preferably from 0.03 to 0.1 mol.

The reaction between the acid component and the diisocyanate component can, for example, be produced using any of the following procedures.

(1) A method of synthesizing the polyamideimide resin by using and reacting the acid component and the diisocyanate component in a single batch.
(2) A method of reacting the acid component with an excess of the diisocyanate component to synthesize an amideimide oligomer having isocyanate groups at the terminals, and then synthesizing the polyamideimide resin by adding additional acid component to react with the terminal isocyanate groups.
(3) A method of reacting an excess of the acid component with the diisocyanate component to synthesize an amideimide oligomer having acid groups or acid anhydride groups at the terminals, and then synthesizing the polyamideimide resin by adding additional diisocyanate component to react with the terminal acid groups or acid anhydride groups.

3. Polyamideimide Resin Composition

The polyamideimide resin composition contains (A) the above polyamideimide resin, and (B) an N-formyl group-containing solvent.

The amount of the polyamideimide resin in the composition may be set appropriately in accordance with the intended application, and although there are no particular limitations, from the viewpoint of maintaining balance with the other components, in one preferred embodiment, the amount of the polyamideimide resin in the composition is preferably at least 5% by mass, more preferably at least 10% by mass, and even more preferably 15% by mass or greater, but on the other hand, is preferably not more than 50% by mass, more preferably not more than 40% by mass, and even more preferably 30% by mass or less.

The composition may contain a combination of a plurality of polyamideimide resins having different raw materials, blocking agents, synthesis methods, number average molecular weights or modification rates or the like, and may also contain a portion of an unblocked polyamideimide resin.

The N-formyl group-containing solvent is as described above in relation to the method for producing a polyamideimide resin. The resin composition may include one or more of the other polymerization solvents described above, and the resin solution obtained in the method for producing a polyamideimide resin can be used favorably, without further modification, as the resin composition.

Moreover, a different organic solvent from the polymerization solvent, for example, an aromatic hydrocarbon solvent such as xylene or toluene, a ketone-based solvent such as methyl ethyl ketone, methyl isobutyl ketone, γ-butyrolactone or δ-valerolactone, or an amide-based solvent or the like may be added for purposes such as altering the viscosity of the composition. Appropriate combinations of these solvents may also be included.

In those cases where another organic solvent is included, the amount of the other organic solvent preferably represents 0 to 50% by mass of the total solvent composition, and more preferably represents 0 to 40% by mass, and even more preferably 0 to 30% by mass.

The polyamideimide resin composition may also contain components other than the above component (A) and component (B).

For example, the polyamideimide resin composition may also include a curing agent. Although there are no particular limitations on the curing agent, epoxy resins (epoxy compounds), phenol resins, melamine resins (melamine compounds), and isocyanate compounds and the like can be used favorably, and among these, the use of an epoxy resin (epoxy compound) is preferred. By adding an epoxy resin, the thermal, mechanical and electrical properties of the polyamideimide resin can be further improved. Further, epoxy resins (epoxy compounds), melamine resins (melamine compounds) and isocyanate compounds can also further enhance the adhesion of the coating film, and are consequently preferred.

In addition to the curing agent, if required, polyethersulfone resins, polyimide resins, polyamide resins, or fluororesins or the like may also be used, either individually or in mixtures.

There are no particular limitations on the epoxy resin (epoxy compound), and examples include triglycidyl isocyanurate, bisphenol-A epoxy resins, bisphenol-F epoxy resins, bisphenol-S epoxy resins, brominated bisphenol-A epoxy resins, biphenyl epoxy resins, phenol novolac epoxy resins, cresol novolac epoxy resins, brominated phenol novolac epoxy resins, bisphenol-A novolac epoxy resins, naphthalene skeleton-containing epoxy resins, aralkylene skeleton-containing epoxy resins, biphenyl-aralkylene skeleton epoxy resins, phenol salicylaldehyde novolac epoxy resins, lower alkyl group-substituted phenol salicylaldehyde novolac epoxy resins, dicyclopentadiene skeleton-containing epoxy resins, glycidylamine epoxy resins and alicyclic epoxy resins. These epoxy compounds may be used individually, or a mixture of two or more compounds may be used.

The epoxy resin may be added alone and reacted with the polyamideimide resin, but may also be added together with a curing agent or a curing accelerator for the epoxy resin so that residual unreacted epoxy compound after curing decreases.

There are no particular limitations on the melamine compounds, and examples include methylol group-containing compounds obtained by reacting melamine with formaldehyde or para-formaldehyde or the like. These methylol groups are preferably etherified with an alcohol having 1 to 6 carbon atoms.

Examples of the isocyanate compounds include polyisocyanates of hexamethylene diisocyanate such as Duranate, and polyisocyanates synthesized from 4,4'-diphenylmethane diisocyanate. The mass average molecular weight of these polyisocyanates is preferably from 500 to 9,000, and more preferably from 1,000 to 5,000.

In terms of the amounts of these epoxy resins, isocyanate compounds and melamine compounds added to the composition, from the viewpoint of ensuring a satisfactory adhesion improvement effect as a result of the addition while also ensuring satisfactory manifestation of the properties of the polyamideimide resin, or from the viewpoint of satisfactorily curing the polyamideimide resin while ensuring phase separation does not occur, the amount of each resin or compound is preferably from 1 to 40 parts by mass, more preferably from 3 to 15 parts by mass, and even more preferably from 5 to 15 parts by mass, per 100 parts by mass of the polyamideimide resin.

The polyamideimide resin composition may also contain other optional components depending on the intended application. The composition can be used favorably as a coating material, and conventional optional components typically used in coating materials may be added, including pigments, fillers, antifoaming agents, preservatives, lubricants, surfactants, antioxidants and ultraviolet absorbers. In this description, the terms "resin composition" and "coating material" or "varnish" are sometimes used with the same meaning.

There are no particular limitations on the surfactant, but a surfactant that ensures that the components for forming the coating film mix uniformly and do not separate (and form a separate layer) before drying of the coating film, and does not leave a large amount of residue following baking is preferred.

Although there are no particular limitations on the amount of the surfactant, in order to maintain a uniform mixed state, the amount of the surfactant in the composition is preferably at least 0.01% by mass, and more preferably 0.5% by mass or greater. On the other hand, in order to ensure that a large amount of residual carbonized matter does not remain in the coating film upon baking and have an adverse effect on the film formability, the amount of the surfactant in the coating material is preferably not more than 10% by mass, and more preferably 5% by mass or less.

In order to improve the water resistance and the like of the coating film, the composition preferably also contains a filler if required.

The type of filler used can be selected in accordance with the intended application of the coating film, with consideration of factors such as the water resistance and chemical resistance of the filler, and is preferably a filler that does not dissolve in water. Specific examples of the filler include metal powders, metal oxides (such as aluminum oxide, zinc oxide, tin oxide and titanium oxide), glass beads, glass flakes, glass particles, ceramics, silicon carbide, silicon oxide, calcium fluoride, carbon black, graphite, mica and barium sulfate. Any of these fillers may be used individually, or a combination of a plurality of fillers may be used.

4. Cured Film

The cured film of an embodiment of the present invention is obtainable by using the polyamideimide resin described above. For example, the cure film can be obtained favorably using the polyamideimide resin composition described above. Although described below in further detail in relation to the method for producing the cured film, the properties of the cured film can be altered by performing low-temperature curing. Specifically, by performing low-temperature curing at 150 to 180° C., and more preferably 150 to 170° C., for at least a prescribed length of time, and then performing post-curing at a high temperature, the curability can be enhanced, the flexibility and bendability of the cured film can be improved, and in addition, the solvent resistance of the cure film can also be improved. It is thought that the improvement in the flexibility and bendability is achieved because of an appropriate increase in the crosslinking density achieved as a result of performing the initial low-temperature curing for at least a prescribed length of time.

5. Method for Producing Cured Film

The method for producing a cured film includes heating a polyamideimide resin composition containing the polyamideimide resin described above, (B) an N-formyl group-containing solvent and (C) a curing agent at a temperature of 150 to 180° C. for at least 10 minutes.

For curing agent described above in the section relating to the polyamideimide resin composition can be used as the curing agent of the above component (C), and of the various possibilities, the use of an epoxy resin is preferred. The amount used of the epoxy resin is preferably from 1 to 30 parts by mass, and more preferably from 3 to 15 parts by mass, per 100 parts by mass of the polyamideimide resin.

It is preferable that the polyamideimide resin composition is first applied to an arbitrary substrate and the solvent within the composition is dried (preliminary drying), and the dried coating film is then cured (baked). There are no particular limitations on the substrate, and for example, an aluminum substrate can be used favorably. By using the polyamideimide resin described above, a coating film having excellent adhesion to the aluminum substrate can be formed.

There are no particular limitations on the coating method used for applying the composition, and conventional coating methods such as dip coating, spray coating and brush application may be employed. The amount of the solvent is preferably adjusted appropriately in accordance with the coating method to dilute the composition to a suitable concentration. The drying conditions such as the drying temperature may be set appropriately in accordance with the boiling point and the like of the solvent contained in the composition.

Curing of the dried coating film is preferably performed by first performing a step (1) of raising the temperature from room temperature and conducting heating at 150 to 180° C. for at least 10 minutes, and subsequently performing a step (2) of conducting heating at 200 to 250° C. for at least 30 minutes.

The heating temperature in step (1) is more preferably from 150 to 170° C. The heating time for step (1) is more preferably at least 15 minutes, but is preferably not more than 30 minutes, and more preferably 25 minutes or less.

The heating temperature in step (2) is more preferably from 210 to 250° C., and the heating time is preferably not more than 90 minutes.

Preferred embodiments are outlined below, but the present invention is not limited to these embodiments.

(1) A polyamideimide resin having an isocyanate group blocked with a compound selected from the group consisting of alcohols, oximes and lactams, and having a carboxyl group blocked with a vinyl ether group-containing compound.

(2) The polyamideimide resin according to (1) above, wherein the compound for blocking the isocyanate group comprises a ketoxime represented by:

CRR'=N—OH    (Formula 1)

(wherein each of R and R' independently represents an alkyl group of 1 to 6 carbon atoms).

(3) The polyamideimide resin according to (1) or (2) above, wherein the vinyl ether group-containing compound comprises an alkyl vinyl ether represented by:

CH$_2$=CH—O—R    (Formula 2)

(wherein R represents an alkyl group of 1 to 10 carbon atoms).

(4) A method for producing a polyamideimide resin that comprises:

reacting a polyvalent isocyanate and a tribasic acid anhydride and/or tribasic acid halide in an N-formyl group-containing solvent to obtain a polyamideimide resin having an isocyanate group and a carboxyl group, and blocking the isocyanate group of the polyamideimide resin with a compound selected from the group consisting of alcohols, oximes and lactams, and blocking the carboxyl group with a vinyl ether group-containing compound.

(5) A method for producing a polyamideimide resin that comprises:

reacting a polyvalent isocyanate having an isocyanate group that has been blocked with a compound selected from the group consisting of alcohols, oximes and lactams, with a tribasic acid anhydride and/or tribasic acid halide having a carboxyl group that has been blocked with a vinyl ether group-containing compound, in an N-formyl group-containing solvent.

(6) The method for producing a polyamideimide resin according to (4) or (5) above, wherein the compound for blocking the isocyanate group comprises a ketoxime represented by:

CRR'=N—CH (Formula 1)
(wherein each of R and R' independently represents an alkyl group of 1 to 6 carbon atoms).
(7) The method for producing a polyamideimide resin according to any one of (4) to (6) above, wherein the vinyl ether group-containing compound comprises an alkyl vinyl ether represented by:

(Formula 2)

(wherein R represents an alkyl group of 1 to 10 carbon atoms).
(8) A polyamideimide resin composition comprising: (A) the polyamideimide resin according to any one of (1) to (3) above, and (B) an N-formyl group-containing solvent.
(9) A cured film obtainable by using the polyamideimide resin according to any one of (1) to (3) above.
(10) A method for producing a polyamideimide resin cured film that comprises:
heating a polyamideimide resin composition containing (A) the polyamideimide resin according to any one of (1) to (3) above, (B) an N-formyl group-containing solvent, and (C) a curing agent at 150 to 180° C. for at least 10 minutes.

EXAMPLES

A variety of examples are described below, but the preferred embodiments of the invention are not limited to these examples, and of course also incorporate many embodiments other than these examples based on the scope of the present invention.

Synthesis Example 1

A two-liter flask was charged with 250.3 g (1.00 mol) of 4,4'-diphenylmethane diisocyanate, 192.1 g (1.00 mol) of trimellitic anhydride, 660 g of 4-morpholine carbaldehyde, and an amount of triethylamine (TNC) as a catalyst to achieve a concentration of 1.5% by mass in the solution, and the resulting mixture was stirred while the temperature was raised to 80° C. and held at that temperature for 8 hours, thereby synthesizing a polyamideimide resin solution having a number average molecular weight of 13,500.

Subsequently, 8.7 g (0.1 mol) of methyl ethyl ketone oxime and 8.7 g (0.087 mol) of butyl vinyl ether were added to the obtained polyamideimide resin solution, and the resulting mixture was reacted at 80° C. for two hours, and then reacted at 110° C. for a further one hour, thus obtaining a blocked polyamideimide resin (polymer A).

Synthesis Example 2

A two-liter flask was charged with 250.3 g (1.00 mol) of 4,4'-diphenylmethane diisocyanate, 192.1 g (1.00 mol) of trimellitic anhydride, 660 g of 4-morpholine carbaldehyde, and an amount of TNC as a catalyst to achieve a concentration of 1.5% by mass in the solution, and the resulting mixture was stirred while the temperature was raised to 80° C. and held at that temperature for 7 hours, thereby synthesizing a polyamideimide resin solution having a number average molecular weight of 12,700.

Subsequently, 4.3 g (0.05 mol) of methyl ethyl ketone oxime and 4.3 g (0.043 mol) of butyl vinyl ether were added to the obtained polyamideimide resin solution, and the resulting mixture was reacted at 80° C. for two hours, and then reacted at 110° C. for a further one hour, thus obtaining a blocked polyamideimide resin (polymer B).

Synthesis Example 1

A two-liter flask, was charged with 150.2 g (0.6 mol) of 4,4'-diphenylmethane diisocyanate, 105.7 g (0.4 mol) of 3,3'-dimethyl-4,4'-diisocyanatobiphenyl, 192.1 g (1.0 mol) of trimellitic anhydride, 672 g of 4-morpholine carbaldehyde, and an amount of TNC as a catalyst to achieve a concentration of 1.5% by mass in the solution, and the resulting mixture was stirred while the temperature was raised to 80° C. and held at that temperature for 9 hours, thereby synthesizing a polyamideimide resin solution having a number average molecular weight of 13,600.

Subsequently, 8.7 g (0.1 mol) of methyl ethyl ketone oxime and 4.3 g (0.043 mol) of butyl vinyl ether were added to the obtained polyamideimide resin solution, and the resulting mixture was reacted at 80° C. for two hours, and then reacted at 110° C. for a further one hour, thus obtaining a blocked polyamideimide resin (polymer C).

Synthesis Example 4

A two-liter flask was charged with 250.3 g (1.0 mol) of 4,4'-diphenylmethane diisocyanate, 153.7 g (0.8 mol) of trimellitic anhydride, 29.2 g (0.2 mol) of adipic acid, 645 g of 4-morpholine carbaldehyde, and an amount of TNC as a catalyst to achieve a concentration of 1.5% by mass in the solution, and the resulting mixture was stirred while the temperature was raised to 80° C. and held at that temperature for 13 hours, thereby synthesizing a polyamideimide resin solution having a number average molecular weight of 12,800.

Subsequently, 8.7 g (0.1 mol) of methyl ethyl ketone oxime and 4.3 g (0.043 mol) of butyl vinyl ether were added to the obtained polyamideimide resin solution, and the resulting mixture was reacted at 80° C. for two hours, and then reacted at 110° C. for a further one hour, thus obtaining a blocked polyamideimide resin (polymer D).

Synthesis Example 5

A two-liter flask was charged with 250.3 g (1.00 mol) of 4,4'-diphenylmethane diisocyanate, 192.1 g (1.00 mol) of trimellitic anhydride, 660 g of 4-morpholine carbaldehyde, and an amount of TNC as a catalyst to achieve a concentration of 1.5% by mass in the solution, and the resulting mixture was stirred while the temperature was raised to 135° C. over about three hours and then held at that temperature for 5 hours, thereby synthesizing a polyamideimide resin (polymer E) having a number average molecular weight of 14,200.

The number average molecular weights of the polyamideimide resins were measured under the following conditions.
GPC apparatus: Hitachi L6000
Detector: Hitachi L4000 UV
Wavelength: 270 nm
Data processing unit: ATT 8
Columns: Gelpack GL-S300MDT-5×2
Column size: 8 mmø×300 mm
Solvent: DMF/THF=1/1 (liter)+0.06 M phosphoric acid+0.06 M lithium bromide
Sample concentration: 5 mg/ml
Injection volume: 5 µl
Pressure: 49 kgf/cm² (4.8×10⁶ Pa)
Flow rate: 1.0 ml/min

Examples and Comparative Example

As shown in Table 1, per 100 parts by mass of the polymer, 10 parts by mass of an epoxy resin and γ-butyrolactone as a dilution solvent were added to each of the polymer solutions obtained above, thereby preparing resin compositions (having a solid fraction of 30% by mass) for each of the examples and the comparative example.

The epoxy resin A that was used was "R-140" manufactured by Mitsui Chemicals, Inc., and the epoxy resin 13 was "YH-434" manufactured by Nippon Steel Corporation.

Each of the polyamideimide resin compositions was applied to an aluminum substrate "A1050P sheet" (thickness: 1 mm×50 mm×100 mm), and following drying of the coating film by heating at 80° C. for 30 minutes, curing was performed using each of the two sets of conditions described below, thus producing cured films with a thickness of 60 μm.

Curing Conditions A (low-temperature curing): the temperature was raised from 80° C. to 170° C. over 15 minutes, curing was performed at 170° C. for 15 minutes, the temperature was then raised to 230° C. over 5 minutes, and curing was performed at 230° C. for 60 minutes, Curing Conditions B: the temperature was raised from 80° C. to 230° C. over 30 minutes, and curing was performed at 230° C. for 60 minutes.

In the following description, the aluminum sheet with the cured film is also referred to as a "test sheet".

Evaluations

The following tests were conducted on the cured films obtained above.

(1) Adhesion: measured in accordance with the old JIS K 5400, with the cross-cut retention rate recorded as the adhesion value.

(2) Pencil hardness: measured in accordance with the old JIS K 5400.

(3) Bendability test: test sheets were bent and wound around rods of diameter 2 mm, 3 mm, 4 mm and 5 mm, and the diameter of the rod at which cracking occurred was recorded as the measured value for the bendability test. A smaller rod diameter indicates superior bendability (flexibility).

(4) Solvent resistance: cuts were formed in the coating Film at 1 mm intervals to form a 10×10 grid of squares, and with the test sheet being heated at 60° C., 0.5 g of N-methylpyrrolidone was dripped onto the cross-cut portions, and the test sheet was left to stand for one minute. Subsequently, a BEMCOT wiper manufactured by Asahi Kasei Corporation (a cleanroom wiper that uses a cupra continuous filament nonwoven fabric "Bemliese" as the base fabric) was used to wipe across the coating film, and the degree of dissolution and detachment of the coating film was confirmed.

A: no dissolution, B: partial dissolution, C: complete dissolution

TABLE 1

| | Example 1 | | | | Example 2 | | Example 3 | | Example 4 | | Comparative Example 1 | | | |
|---|---|---|---|---|---|---|---|---|---|---|---|---|---|---|
| Polymer | A | | | | B | | C | | D | | E | | | |
| Epoxy resin | A | | B | | B | | B | | B | | A | | B | |
| Curing conditions | A | B | A | B | A | B | A | B | A | B | A | B | A | B |
| Adhesion | 100 | 100 | 100 | 100 | 100 | 100 | 100 | 100 | 100 | 100 | 88 | 62 | 76 | 55 |
| Pencil hardness | 2H | 2H | 2H | 2H | 2H | 2H | 2H | 2H | 2H | 2H | 2H | 2H | 2H | H |
| Bendability test | 2 mm | 5 mm | 2 mm | 4 mm | 2 mm | 4 mm | 2 mm | 4 mm | 2 mm | 4 mm | 3 mm | 3 mm | 4 mm | 4 mm |
| Solvent resistance | B | C | A | B | A | B | A | B | A | B | C | C | C | C |

As shown in Table 1, the polyamideimide resin cured films obtained in the examples exhibited excellent adhesion compare with the comparative example. Further, the polyamideimide resin cured films of the examples also exhibited excellent bendability and solvent resistance, and these results were particularly superior when curing was performed using the curing conditions A. In contrast, the cured film of the comparative example in which blocking of the polyamideimide resin was not performed exhibited poor solvent resistance and the like regardless of which curing conditions were used.

The invention claimed is:

1. A method for producing a polyamideimide resin comprising:
    reacting a polyvalent isocyanate and a tribasic acid anhydride and/or tribasic acid halide in an N-formyl group-containing solvent at a temperature of 70 to 80° C. to obtain a polyamideimide resin having an isocyanate group and a carboxyl group,
    blocking the isocyanate group of the polyamideimide resin with a compound selected from the group consisting of alcohols, oximes and lactams, and blocking the carboxyl group with a vinyl ether group-containing compound,
    wherein the reaction between the polyvalent isocyanate and the tribasic acid anhydride and/or tribasic acid halide is performed by using at least one catalyst selected from the group consisting of tertiary amines, and the reaction temperature does not exceed 80° C.

2. A method for producing a polyamideimide resin comprising:
    reacting a polyvalent isocyanate having an isocyanate group that has been blocked with a compound selected from the group consisting of alcohols, oximes and lactams, with a tribasic acid anhydride and/or tribasic acid halide having a carboxyl group that has been blocked with a vinyl ether group-containing compound, in an N-formyl group-containing solvent at a temperature of 70 to 80° C. to obtain a polyamideimide resin,
    wherein the reaction between the polyvalent isocyanate and the tribasic acid anhydride and/or tribasic acid halide is performed by using at least one catalyst selected from the group consisting of tertiary amines, and the reaction temperature does not exceed 80° C.

3. The method for producing a polyamideimide resin according to claim 1, wherein the compound for blocking the isocyanate group comprises a ketoxime represented by:

$$CRR'=N-OH, \qquad \text{(Formula 1)}$$

wherein each of R and R' independently represents an alkyl group of 1 to 6 carbon atoms.

4. The method for producing a polyamideimide resin according to claim 1, wherein the vinyl ether group-containing compound comprises an alkyl vinyl ether represented by:

$$CH_2=CH-O-R, \quad \text{(Formula 2)}$$

wherein R represents an alkyl group of 1 to 10 carbon atoms.

5. The method for producing a polyamideimide resin according to claim 2, wherein the compound for blocking the isocyanate group comprises a ketoxime represented by:

$$CRR'=N-OH, \quad \text{(Formula 1)}$$

wherein each of R and R' independently represents an alkyl group of 1 to 6 carbon atoms.

6. The method for producing a polyamideimide resin according to claim 2, wherein the vinyl ether group-containing compound comprises an alkyl vinyl ether represented by:

$$CH_2=CH-O-R, \quad \text{(Formula 2)}$$

wherein R represents an alkyl group of 1 to 10 carbon atoms.

* * * * *